United States Patent
Morrison et al.

(10) Patent No.: US 6,542,940 B1
(45) Date of Patent: Apr. 1, 2003

(54) METHOD AND APPARATUS FOR CONTROLLING TASK EXECUTION IN A DIRECT MEMORY ACCESS CONTROLLER

(75) Inventors: Gary R. Morrison, Austin, TX (US); Peter J. Myers, Austin, TX (US); Charles Edward Nuckolls, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,367

(22) Filed: Jan. 18, 2000

Related U.S. Application Data

(63) Continuation-in-part of application No. 09/426,009, filed on Oct. 25, 1999, now Pat. No. 6,421,744.

(51) Int. Cl.[7] .............................................. G06F 13/28
(52) U.S. Cl. .......................... 710/22; 710/58; 713/502; 714/47
(58) Field of Search ............................... 710/1, 22, 23, 710/24, 25, 28, 52, 58; 713/500, 502, 503; 712/225, 235, 228; 714/47, 48, 55, 56

(56) References Cited

U.S. PATENT DOCUMENTS

| | | | | |
|---|---|---|---|---|
| 5,091,870 A | * | 2/1992 | Datsko et al. ............... 711/100 |
| 5,239,631 A | * | 8/1993 | Boury et al. ................. 395/325 |
| 5,379,381 A | * | 1/1995 | Lamb ........................... 395/275 |
| 5,452,432 A | * | 9/1995 | Macachor .................... 395/425 |
| 5,628,026 A | * | 5/1997 | Baron et al. .................... 710/1 |
| 5,640,573 A | * | 6/1997 | Gephardt et al. ........... 713/300 |
| 5,974,239 A | * | 10/1999 | Klein ........................... 710/129 |
| 6,154,857 A | * | 11/2000 | Mann ........................... 714/30 |

* cited by examiner

Primary Examiner—Jeffrey Gaffin
Assistant Examiner—RiJue Mai
(74) Attorney, Agent, or Firm—James L. Clingan, Jr.; Kathryn M. Tsirigotis

(57) ABSTRACT

Method for maintaining an execution interval for a task requestor to a DMA. A timer is provided with two counters, one (34) to maintain the execution interval and the second (32) to track the execution time of a task in the DMA. Each task has a predetermined execution time allowance. A task acknowledge (TACK) signal enables the tracking. A task request signal (TREQ) is generated during each execution interval until the execution time allowance is completed. The length of the second counter is less than the first counter. In one embodiment, if the first counter expires before the execution time allowance is completed, a task error signal (TERR) is illustrated.

10 Claims, 3 Drawing Sheets

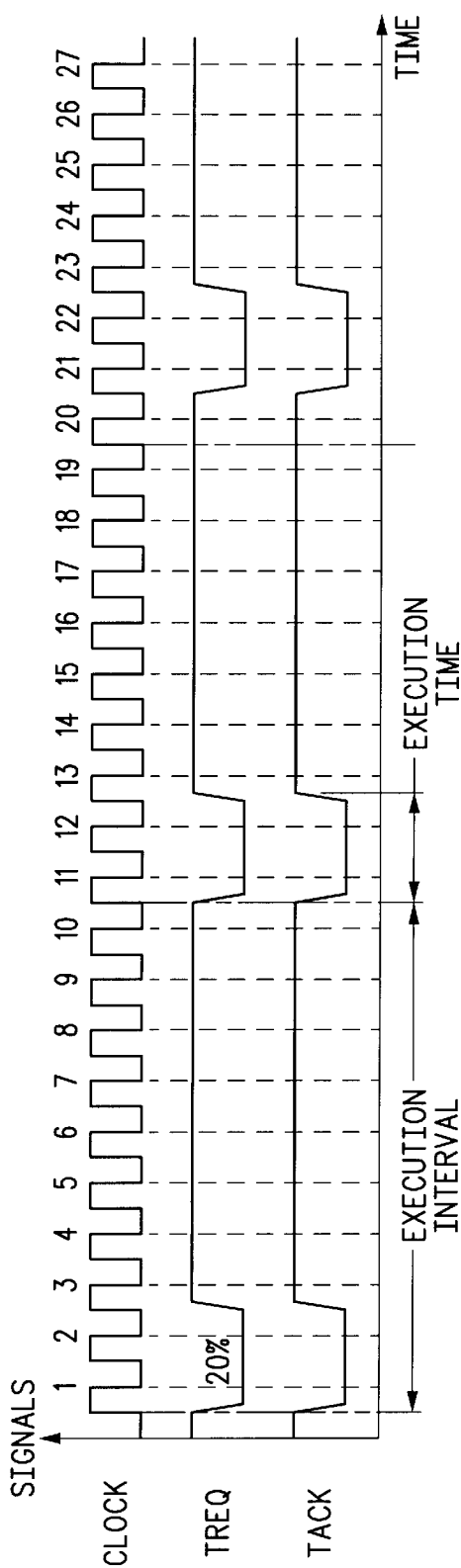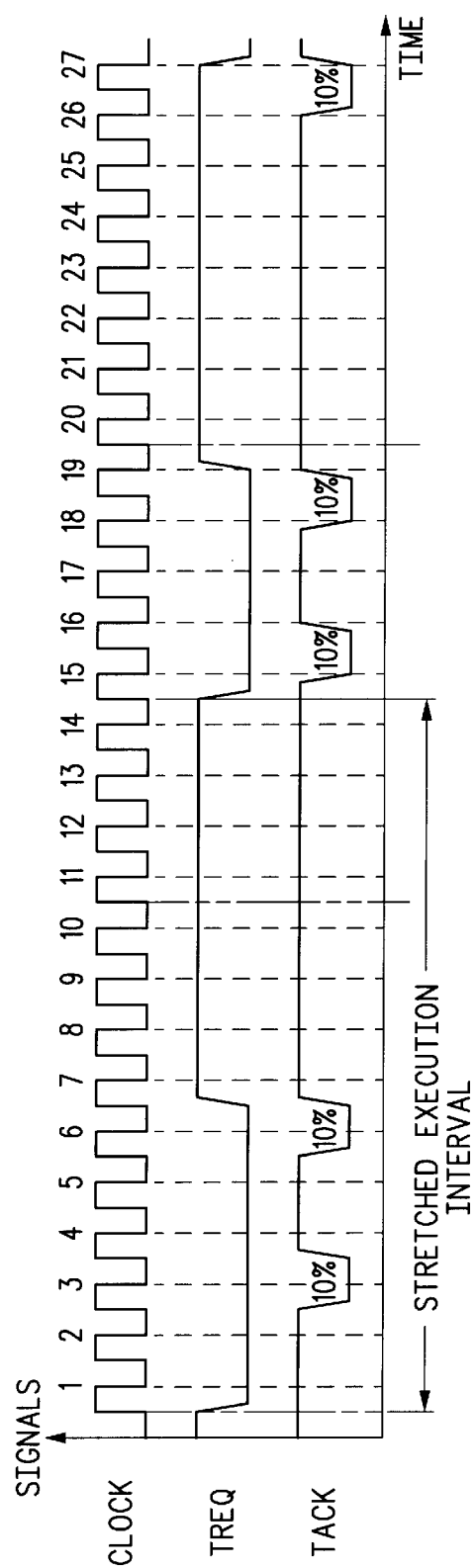

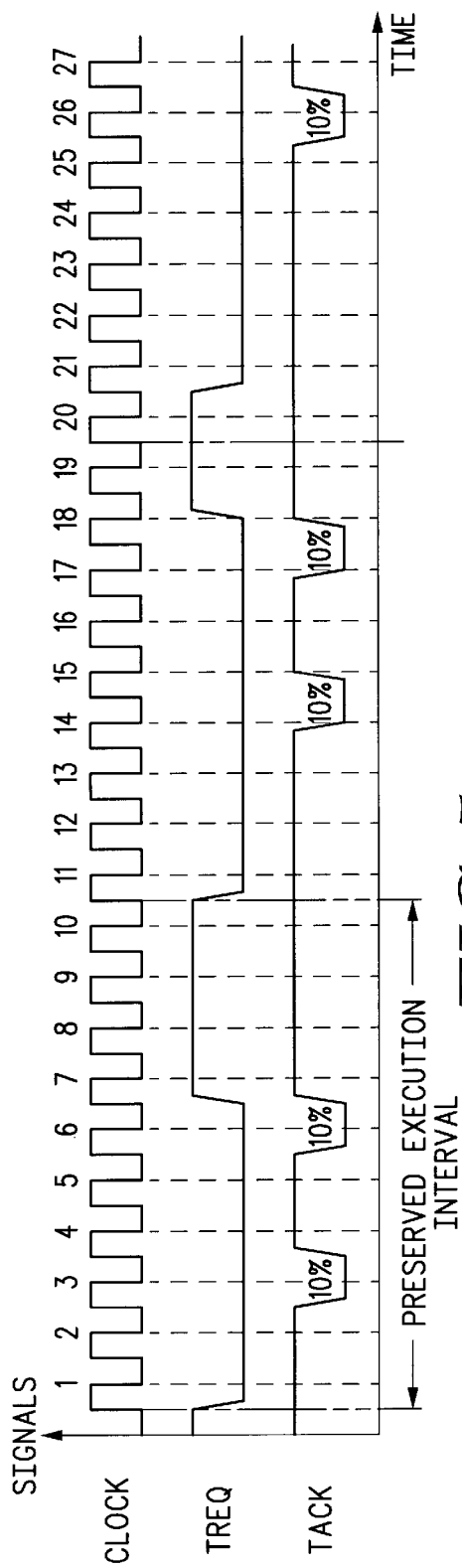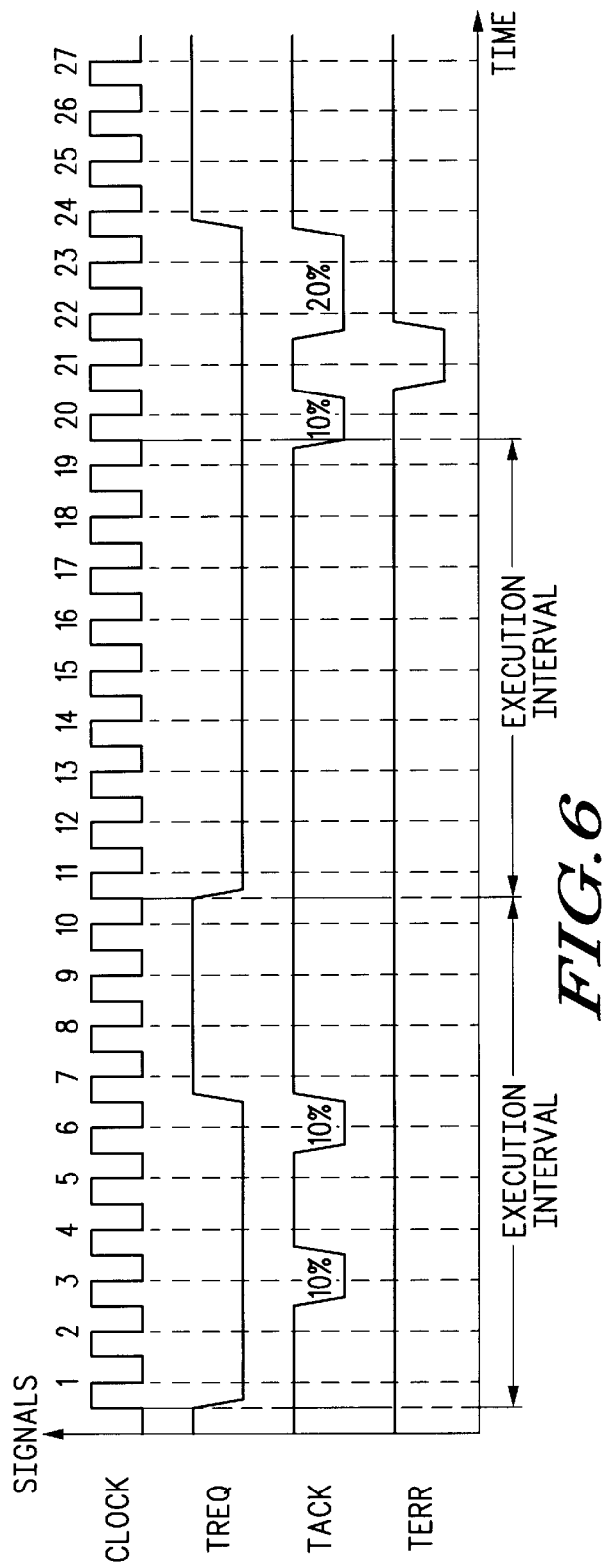

METHOD AND APPARATUS FOR CONTROLLING TASK EXECUTION IN A DIRECT MEMORY ACCESS CONTROLLER

RELATED APPLICATIONS

This is a continuation-in-part (CIP) of U.S. patent application Ser. No. 09/426,009 by Gary Morrison, et al., filed on Oct. 25, 1999 now U.S. Pat. No. 6,421,744 issued on Jul. 16, 2001, and assigned to the assignee hereof.

FIELD OF THE INVENTION

The present invention relates to direct memory access controllers, and specifically to controlling task execution in a direct memory access controller by maintaining an execution interval.

BACKGROUND OF THE INVENTION

Direct Memory Access (DMA) controllers are used in computer systems to offload repetitive data movement tasks from a processor in a data processing system. As multiple input devices and multiple memory storage locations may exist within a data processing system, the DMA must coordinate the performance of difference tasks over time. A key concern in this coordination is to maximize the throughput of the DMA unit.

In an embedded system, it is desirable to balance the various types of utilization and avoid throughput bottlenecks. The processing time as well as bus bandwidth influence the throughput. Most designers estimate processing time and bus utilization. These considerations apply to data-communication channels, shared memories, mass-storage devices, and so forth.

Many DMA controllers have dedicated channels, each coupled to a specific input device. In this case bus bandwidth may be allocated to each of the the devices, where each device is limited to a certain percentage of the bandwidth or a maximum bus ownership timer percentage.

Many requestors are for random and nondeterministic activities that disrupt the scheduling and decrease throughput. Typical systems assign activities to groups according to throughput using a deterministic scheduling means and calculate the throughput left for random ones. These timing control mechanisms do not reflect the tasks and functions performed within the DMA controller.

Some of these processing throughput requirements are on an on-going basis, and others only occur under specific circumstances. The on-going processing tasks, which often occur on a random basis, such as in response to receiving data from a communication channel, usually are abstracted to an average processing overhead. So, based upon the speed of the communication channels and what has to be done to that channel's data, it is possible to estimate an average percentage of the total available processing bandwidth.

Once the on-going background processing is accounted for, each set of circumstances under which the system can operate may be considered. That might include, for example, scanning a keypad searching for user input versus processing that user input. For example, if the background tasks consume about 20% of the available processing throughput, then each of the remaining tasks must take no more than a total of 80% of the available processing time.

For DMA processing, a timer waveform with a varying pulse width can be used to periodically cause a given processing task. When the waveform from the timer goes high, the DMA controller schedules processing and discontinues processing when that timer waveform goes low. However, higher-priority DMA processing may preempt the DMA controller from actually beginning the processing when the rising edge of the timer waveform schedules it to run. This non-period preserving timer assumes that once the process begins it will run for an allotted amount of time. A problem exists as stopping the timer acts to stretch out the period of timer over which processing is allowed and distorts the percentage of time allocated to that task. Non-period preserving timers ensure that the predetermined percentage of processing time is available but do not ensure that this percentage is within a predetermined interval.

Another approach used on typical multitasking operating systems to bandwidth scheduling uses a periodic timer to allow a different task to run. These timers do not specify how frequently a task runs. This is useful for applications that require specific timing intervals that are smaller than the scheduler tick, or are not easy multiples of the scheduler-tick's period.

A need therefore exists for a task-execution timing scheme allowing deterministic processing time of tasks within the DMA unit and a method of controlling task requestors to a DMA that calculates the processing power and ability for a given condition and adjusts the throughput for a variety of devices. Still further, a need exists for a method of allocating time to tasks and preserving the period of timers for a DMA. Also a need exists for a method of and timer for bandwidth scheduling that specifies how frequently a task runs.

BRIEF DESCRIPTION OF THE DRAWINGS

The present invention may be more fully understood by a description of certain preferred embodiments in conjunction with the attached drawings in which:

FIGS. 3–6 illustrate, in block diagram form, a DMA controller as in FIG. 3 in accordance with one embodiment of the present invention.

DETAILED DESCRIPTION OF THE PREFERRED EMBODIMENTS

For clarity the terms assertion and negation are used herein to avoid confusion regarding "active-low" and "active-high" signals. The term assert or assertion is used to indicate that a signal is active or true, independent of whether that level is represented by a high or a low voltage. The term negate or negation is used to indicate that a signal is inactive or false.

According to one aspect of the present invention, in a data processing system having a processor, a memory, a direct memory access controller which executes a plurality of tasks, and a timer unit for controlling task execution time, the timer unit includes a first counter coupled to the direct memory access controller, the first counter for preserving an execution interval; and a second counter coupled to the first counter, the second counter for tracking the task execution time of a task as a function of the execution interval.

According to another aspect of the present invention, a method for controlling task execution time in a direct memory access controller, includes the steps of counting an execution interval; and tracking execution time for a task within the execution interval.

Figure 1:
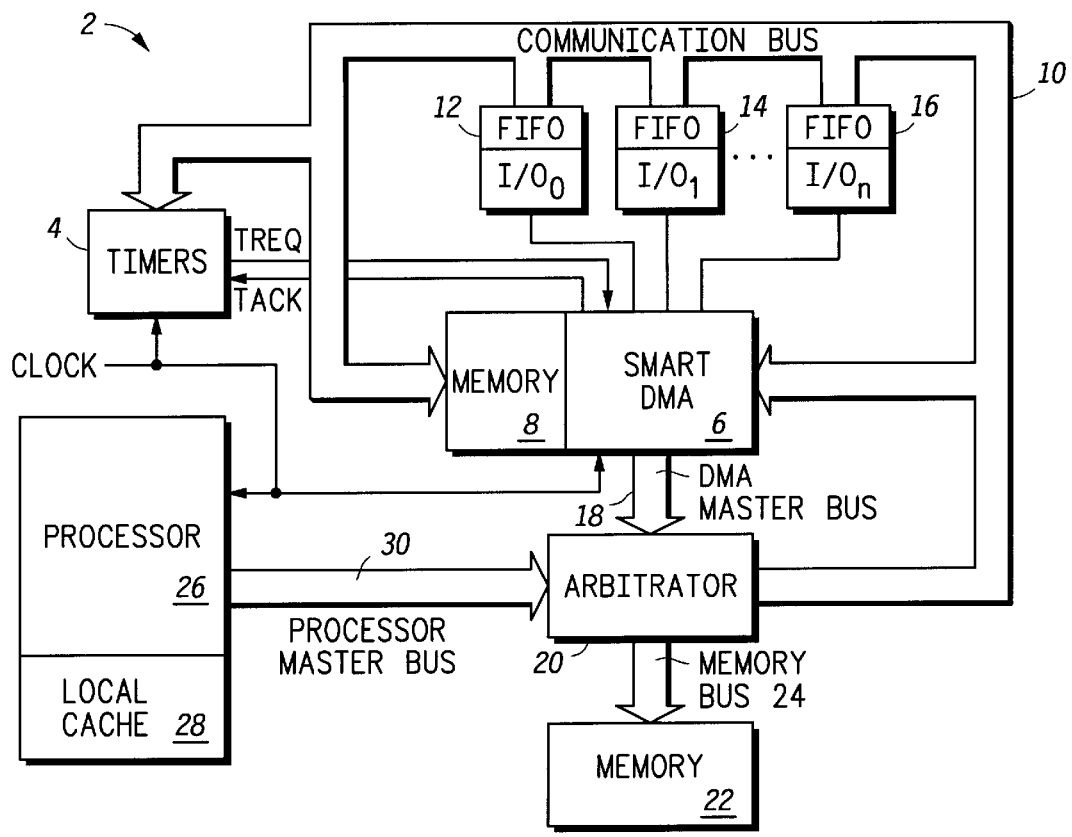
FIG. 1 illustrates, in block diagram form, a data processing system having a direct memory access (DMA) controller and timers.

The present invention provides a method of using a timer as a requestor to a direct memory access controller (DMAC). As illustrated in FIG. 1, a data processing system 2 includes a timer unit 4, a DMA unit 6, and a memory 8. A communication bus 10 is coupled to the DMA unit 6, the timer unit 4, and the memory 8. A plurality of input/output devices, I/O$_0$ 12, I/O1 14, and I/O2 16, are also coupled to the communication bus 10. Each of the input/output devices is also coupled to the DMA unit 6, where the DMA unit 6 is as described in U.S. patent application Ser. No. 09/426,009 by Morrison, et al, filed on Oct. 25, 1999.

The data processing system 2 further includes a DMA master bus 18 coupled to an arbitrator 20. The arbitrator 20 is further coupled to a memory 22 via a memory bus 24. A processor 26 including a local cache 28 is coupled to the arbitrator 20 via a processor master bus 30.

Each of the input/output devices and the timer unit 4 act as initiators or requestors to the DMA unit 6. Typically, the input/output devices initiate a data transfer within the data processing system 2, where a timer is used as a requestor to a DMA unit in activity not involving peripherals, such as noncommunication activity. Additionally, a timer may be a requester in a memory-to-memory operation including DSP operations.

As illustrated in FIG. 1, a clock signal is provided to the timer unit 4, the DMA unit 6, and the processor 26. The clock signal provides a common clock for synchronizing operation within data processing system 2. The timer unit 4 may also be driven by a separate external clock. The timer unit 4 generates a task request signal (TREQ) to request a task in the DMA unit 6. In response, while the DMA unit 6 is executing the requested task, the DMA unit 6 generates a task acknowledge signal (TACK) for the timer unit 4.

Figure 2:
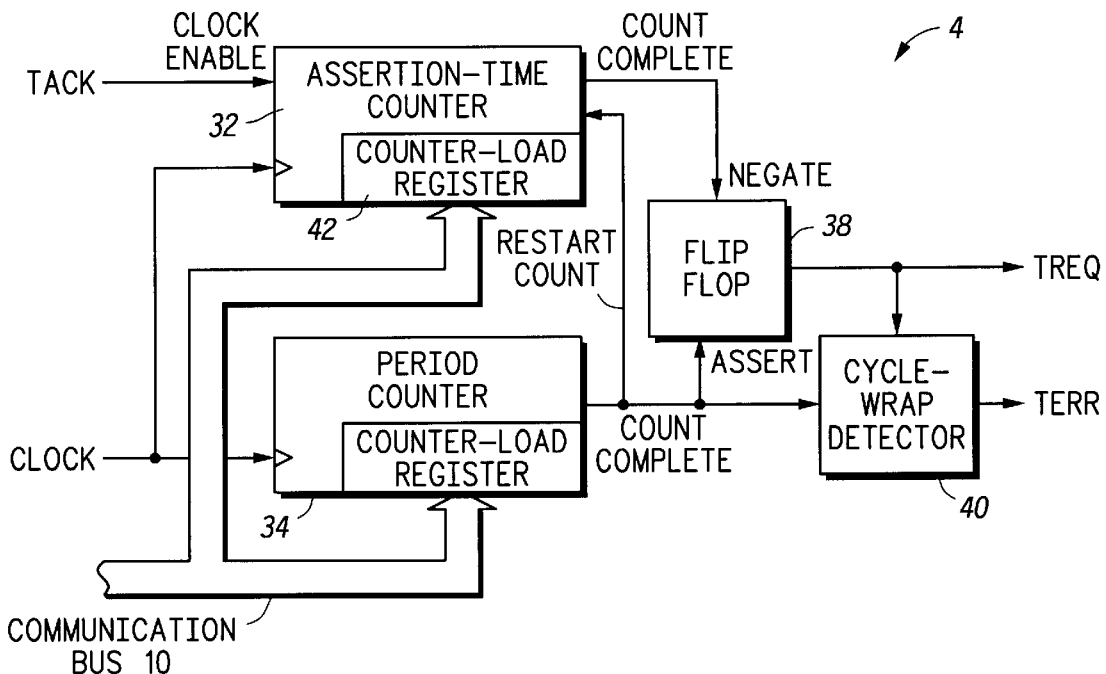
FIG. 2 illustrates, in block diagram form a timer as in FIG. 1 in accordance with one embodiment of the present invention.

The timer unit 4 is further detailed in FIG. 2, where the timer unit 4 includes an assertion-time counter 32 and a period counter 34 The period counter 34 maintains an execution interval for a task, where the task executes in the DMA unit 6. The execution interval is a predetermined number of processing cycles of the DMA unit 6 that indicates how frequently the task executes. The period counter 34 is a free running counter. The period counter 34 receives the clock signal and in response increments. A counter-load register 36 is provided within the period counter 34 for another initialization after the count period expires. The value stored in the counter-load register 36 determines when the period counter 34 expires. Note that the period counter 34 may be a count-up counter, where the count expires when it attains the value of the counter-load register 36, or the period counter 34 may be a count-down counter loaded with the value in the counter-load register 36 that expires when the counter equals zero.

When the period counter 34 expires it generates a count complete signal that is provided to a flip-flop 38 and a cycle-wrap detector 40. The count complete signal indicates the end of one execution interval and the beginning of a next execution interval. The count complete signal is also provided to the assertion-time counter 32 indicating that an execution time has ended and new execution interval is beginning. In response to the count complete signal, the assertion-time counter 32 restarts its count.

The assertion-time counter 32 is responsive to the TACK signal, which acts as a clock enable. The assertion-time counter 32 only increments when the TACK signal is asserted. The assertion-time counter 32 tracks the execution time of a task. The execution time is the actual time the DMA unit 6 is executing the task. The execution time allowance may be expressed as a percentage of the execution interval, where the execution time is less than the execution interval. This allows the DMA unit 6 to multiplex operation of multiple requesters, where each requestor is assigned a predetermined portion of the execution interval. In one embodiment, the execution interval is a periodic interval having a predetermined number of cycles. The predetermined number may be provided as the value of the counter-load register 42 of the assertion-time counter 32. The assertion-time counter 32 tracks the actual time that the task executes and when the proportion is satisfied in an execution interval, the assertion-time counter 32 effectively negates the TREQ signal to the DMA unit 6.

The flip-flop 38 acts a switch to assert or negate the TREQ signal. On the start of each new execution interval, the TREQ signal is asserted, making a request to the DMA unit 6 for the task associated with the timer unit 4. The period counter 34 begins counting a new execution interval. Whenever the DMA unit 6 asserts the TACK signal, the assertion-time counter 32 tracks or counts the execution time. Once the predetermined proportion is satisfied, the count complete signal is provided to switch the flip-flop 38 and negate the TREQ signal. The period counter 34 continues counting until expiration of the execution interval. Once a new execution interval begins, the flip-flop 38 switches again and asserts the TREQ signal, starting the process again.

If during the execution interval an interrupt or other interruption is made to execution of the task in the DMA unit 6, i.e. the TACK signal is negated, the assertion-time counter 32 halts its count, but resumes every time TACK is asserted.

One embodiment of the present invention, illustrated in FIG. 2, provides an error signal, TERR, when the period counter 34 expires prior to the expiration of the execution time allowance. In this case, the execution interval ends without the task executing for the allowance within that interval. Unlike prior art systems which may extend the interval resulting in a change in the proportion of time the task executes, the present invention restarts the execution interval. In this case, the count complete signal has not been provided by the assertion-time counter 32 to the flip-flop 38 to negate the TREQ signal. Once the period counter 34 expires it generates a count complete signal to the a cycle-wrap detector 40. If the TREQ is asserted and the a cycle-wrap detector 40 receives the count complete signal, the a cycle-wrap detector 40 generates an error signal, TERR. The TERR indicates to the DMA unit 6 that an error has occurred and the execution time did not complete within the execution interval.

The case where the required execution time, as tracked by the assertion-time counter 32, has not occurred within the execution interval, as tracked by the period counter 34, a cycle wrap occurs. A cycle wrap generates an interrupt to the processor. The processor then allows the application program to adjust the execution time percentages of each task. The processor may also perform some of the calculation that was not completed.

FIGS. 3–6 illustrate timing scenarios for a variety of situations. In each of these timing diagrams the horizontal axis represents time. The vertical axis represents the various logic signals, such as CLOCK, representing execution cycles of the DMA, TREQ, representing a task request signal provided to the DMA, and TACK, representing a task acknowledge signal provided by the DMA. Each of these signals is negative-logic or low active. Note that for clarity in the timing diagrams the number of clock cycles is kept small. In a typical data processing system, the execution intervals and execution times are 10 to 1000 times those illustrated.

Several examples of the operation of prior art timing schemes are illustrated in FIGS. 3–4. Unlike the present invention, the illustrated prior art schemes employ a single timer. Starting with FIG. 3, the execution interval is ten (10) clock cycles, and the predetermined execution time. allowance for this task is 20% or two (2) cycles. In this ideal example, the execution is not interrupted and begins exactly when requested, but consumes exactly two (2) cycles, indicated by assertion of TACK. Note that the TACK signal is asserted for exactly the time needed to satisfy the execution time allowance. This may be implemented by a clock gated to a timer to effectively freeze the TREQ signal until completion of the execution time.

FIG. 3 illustrates a timer providing a pulse wave with a selectable but fixed pulse width as a DMA initiator. This timer may be implemented with as single counter. The pulse wave is then asserted for some portion of the count period, else the pulse wave is negated. The pulse wave acts as an initiator to the DMA; the DMA is active immediately in response to assertion of TREQ and continues uninterrupted during the portion the pulse wave is asserted. Typically, however, there is a delay between initiation and DMA activity. The delay is frequently due to higher-priority DMA requests needing to complete. Additionally, there is some further delay from switching from one task requestor to another. Since the timer has a fixed pulse width, if the timer is kept running, the delay reduces the total amount of time the requested task runs. If the delay is greater than the processing time, i.e. assertion time of the pulse wave, the task won't run at all.

FIG. 4 illustrates a case where, unlike FIG. 3, TACK does not assert at the same time as TREQ, and the total execution time allowance is discontinuous, including a first cycle and a second cycle. Here, the execution interval is stretched from ten (10) cycles to fourteen (14) cycles, and the execution time allowance is 20%. The total execution time allowance is still within the execution interval. Again, this may be implemented by gating the timer.

The counter stops counting when DMA activity is requested, but not currently serviced. In other words, the counter only counts when TACK is asserted. This ensures that the requested number of processing cycles occur within the period of the timer, but does not preserve the execution interval nor the proportion of processing time as the execution interval stretches when the counter is disabled.

FIGS. 5–6 illustrate timing scenarios according to one embodiment of the present invention, using the timer unit 4 as illustrated in FIG. 2. The execution interval is ten (10) cycles, and the execution time allowance is 20%. The assertion-time counter 32 tracks the execution time based on assertion of the TACK signal. Because the period counter 34 maintains the execution interval of ten (10) cycles, a predictable execution time percentage is maintained.

FIG. 6 illustrates the error detection capability of one embodiment of the present invention. Here the second execution interval illustrated ends while only 10% of the execution time is used. At the end of the second execution interval, cycle 20, the TERR signal is asserted to announce that the requested execution percentage count not be maintained. Note that the assertion-time counter 32 resets and begins counting anew from cycle 20.

The present invention provides a method of maintaining an execution interval for a task requestor to a DMA. While the present invention has been illustrated with respect to the DMA of U.S. patent application Ser. No. 09/426,009 by Morrison, et al., assigned to Motorola, the present invention is applicable to other types of DMA that receive a task request signal and provide a task acknowledge signal. The present invention is applicable to a processing tasks in a microprocessor operating system.

With respect to the timer illustrated in FIG. 2, alternate embodiments may implement the present invention using a flip-flop, switch or other device that asserts the TREQ signal during an execution interval while the execution time has not satisfied, and negate the TREQ when the execution time is satisfied.

Those skilled in the art will recognize that modifications and variations can be made without departing from the spirit of the invention. Therefore, it is intended that this invention encompass all such variations and modifications as fall within the scope of the appended claims.

What is claimed is:

1. In a data processing system having a processor, a memory, a direct memory access controller which executes a plurality of DMA tasks, and a timer unit for controlling task execution time, the timer unit comprising:

a first counter coupled to the direct memory access controller, the first counter for preserving an execution interval; and a second counter coupled to the first counter, the second counter for tracking the task execution time of a DMA task of the plurality of DMA tasks as a function of the execution interval.

2. The timer unit of claim 1, wherein the first counter and the second counter restart counting in response to expiration of the first counter.

3. The timer unit of claim 1, wherein the second counter counts while a DMA task is processing.

4. The timer unit of claim 3, wherein the first counter has a larger count length than the second counter.

5. The timer unit of claim 4, further comprising:

an error detection unit coupled to the first and second counters, the error detection unit generating an error signal when the first counter expires prior to expiration of the second counter.

6. The timer unit of claim 1, wherein the second counter tracks task execution time based on a task acknowledge signal received from the direct memory access controller.

7. A method for controlling task execution time in a direct memory access controller that executes a plurality of DMA tasks, comprising the steps:

counting an execution interval; and tracking execution time for a DMA task of the plurality of DMA tasks within the execution interval.

8. The method of claim 7, further comprising the step of:

generating an error signal if the execution time exceeds a predetermined proportion of the execution interval.

9. The method of claim 7, further comprising the step of:

negating a task request signal when the execution time reaches a predetermined proportion of the execution interval.

10. The method of claim 7, wherein the step of tracking execution time comprises the step of:

counting processing cycles while a task acknowledge signal is asserted.

* * * * *